US011872570B2

(12) United States Patent
Bathelt et al.

(10) Patent No.: US 11,872,570 B2
(45) Date of Patent: Jan. 16, 2024

(54) CENTRIFUGE HAVING A DRUM TOOL

(71) Applicant: GEA MECHANICAL EQUIPMENT GMBH, Oelde (DE)

(72) Inventors: Thomas Bathelt, Oelde (DE); Wilfried Mackel, Lippetal-Herzfeld (DE); Marcel Weghake, Ahlen (DE)

(73) Assignee: GEA Mechanical Equipment GmbH, Oelde (DE)

( * ) Notice: Subject to any disclaimer, the term of this patent is extended or adjusted under 35 U.S.C. 154(b) by 747 days.

(21) Appl. No.: 17/040,806

(22) PCT Filed: Apr. 11, 2019

(86) PCT No.: PCT/EP2019/059272
§ 371 (c)(1),
(2) Date: Sep. 23, 2020

(87) PCT Pub. No.: WO2019/197539
PCT Pub. Date: Oct. 17, 2019

(65) Prior Publication Data

US 2021/0362165 A1 Nov. 25, 2021

(30) Foreign Application Priority Data

Apr. 13, 2018 (DE) ..................... 20 2018 102 027.7

(51) Int. Cl.
*B04B 7/08* (2006.01)
*B04B 7/00* (2006.01)

(52) U.S. Cl.
CPC .......... *B04B 7/08* (2013.01); *B04B 2007/005* (2013.01)

(58) Field of Classification Search
CPC ............................ B04B 7/08; B04B 2007/005
See application file for complete search history.

(56) References Cited

U.S. PATENT DOCUMENTS 5,996,441 A * 12/1999 Bateman ................. B67B 7/182 81/3.2
2012/0100980 A1* 4/2012 Lahmann .................. B04B 7/08 494/84

FOREIGN PATENT DOCUMENTS

DE 484735 C 10/1929
DE 847428 C 8/1952
(Continued)

OTHER PUBLICATIONS

International Search Report dated Jul. 10, 2019 in related/corresponding International Application No. PCT/EP2019/059272.
(Continued)

*Primary Examiner* — Walter D. Griffin
*Assistant Examiner* — Shuyi S. Liu
(74) *Attorney, Agent, or Firm* — PATENT PORTFOLIO BUILDERS PLLC

(57) ABSTRACT

A separator for centrifugally processing includes a rotatable drum having at least two drum parts, which can be rotated relative to one another at a screw thread. A drum tool is designed to open and close the drum by rotating the drum parts screwed together by the screw thread. The drum tool includes a retaining element attachable to the one drum part, a driver element attachable to the other, relatively rotatable drum part, and at least one rotation device for the relative rotation between the retaining element and the driver element together with the drum parts. The retaining and driver elements each having two or more points of engagement for the rotation device. The points of engagement are symmetrically arranged in such a way that forces produced by the rotation device produce a torque for the relative rotation of the drum parts, but no resulting force acting on the screwed drum parts on one side is produced.

15 Claims, 4 Drawing Sheets

(56) References Cited

FOREIGN PATENT DOCUMENTS

Figure 1:
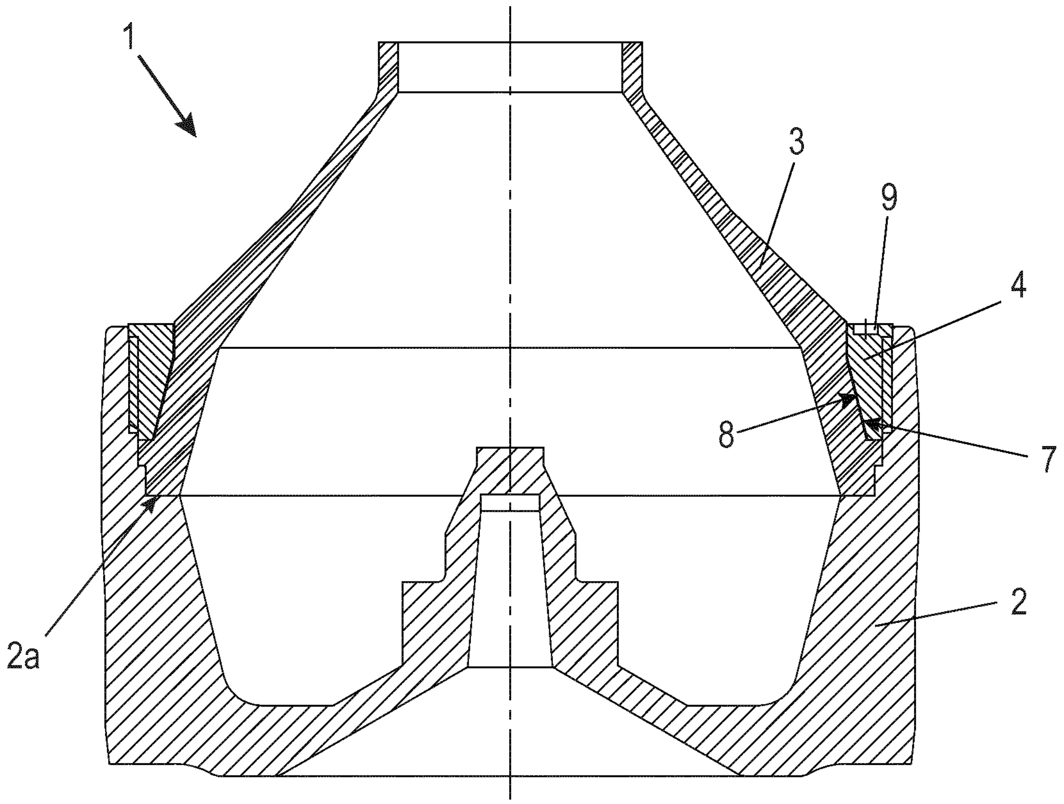

| | | | |
|---|---|---|---|
| DE | 2615058 | A1 | 10/1977 |
| DE | 102012213821 | A1 | 2/2014 |
| DE | 202015101346 | U1 | 6/2016 |
| GB | 437030 | A | 10/1935 |

OTHER PUBLICATIONS

Search Report created on Dec. 6, 2018 in related/corresponding DE Application No. 20 2018 102 027.7.

Written Opinion dated Jul. 10, 2019 in related/corresponding International Application No. PCT/EP2019/059272.

* cited by examiner

CENTRIFUGE HAVING A DRUM TOOL

BACKGROUND AND SUMMARY OF THE INVENTION

Exemplary embodiments of the present invention relate to a centrifuge having a drum tool.

A centrifuge drum, in particular a separator drum, of the generic type has several drum parts. These include a lower drum part and an upper drum part and possibly a drum locking ring. A screw connection is formed between at least two of these parts. This must be tightened and loosened with a tool in order to open or close the drum.

The loosening—and also the tightening—of this screw connection is carried out with the aid of an impact spanner adapted to the respective drum, which is usually designed as a ring spanner.

The ring spanner is placed positively on the locking ring of the drum and then, with the aid of a striking pin or sledge hammer, is brought into a rotary movement by means of blows, whereby the screw connection is loosened (or also tightened). The drum is not mechanically fixed during this process. The counter-torque against the impact on the drum locking ring is provided by the frictional torque of the screw connection and the mass moment of inertia of the drum.

The problem that arises from this is described in GB 437 030. Due to the required play of the ring spanner to the torque transmission surfaces on the drum locking ring, there is a risk of local plastic deformation of the torque transmission surfaces on the drum locking ring due to impulse loading resulting from the abrupt application of force to the ring spanner. The plastic deformation shows itself in the form of hammer-like indentations on the torque transmission surfaces. Depending on the frequency of loosening and retightening, there is progressive wear on the torque transmission surfaces, which can be accompanied by increasing burriness of the torque transmission surfaces, which must be minimized.

Approaches to solving this problem can also be found in DE 2615 058 or DE 484 735. However, according to the technical teaching of both publications, lever forces are used that act on one side of the screw connection of the drum locking ring, which can still lead to tilting of the threads and thus to seizing of the screw connection.

A further disadvantage of the proposed solution from DE 2615 058 and DE 484 735 is that the drum must be fixed mechanically, as the lever mechanism requires a counter-torque to the torque of the lever.

Based on the prior art, exemplary embodiments of the invention are directed to a centrifuge with a drum tool for a centrifuge drum, in which the disadvantages of the prior art are reduced.

A centrifuge is created, in particular a separator, for the centrifugal processing of a flowable product and drum tool, having at least the following features: a rotatable drum defining a centrifuge chamber and wherein the drum has at least two drum parts, which can be rotated relative to one another on a thread, the drum tool which is designed for opening and/or closing the drum by rotating the drum parts screwed together via the thread, wherein the drum tool has at least the following: a retaining element that can be attached to one drum part, a driver element that can be attached to the other, relatively rotatable drum part, at least one rotation device for rotating the retaining element relative to the driver element together with the drum parts, wherein the retaining element and the driver element each have two or more points of engagement for the rotation device, which are arranged symmetrically in such a way that the forces generated by the rotation device produce a torque for relative rotation of the drum parts, but no or no appreciably disadvantageous resultant force is produced that acts unilaterally (radially and/or axially) on the screwed drum parts, so that these cannot tilt during relative rotation.

This avoids jamming of the drum parts that are screwed together and the disadvantages described at the beginning are reduced in a simple way.

The invention is particularly suitable for centrifuges in which the lower drum part and upper drum part are either directly screwed together or in which a drum locking ring and the upper or lower drum part are screwed together.

According to a variant that is easy to implement in terms of design, the retaining element can be designed as a retaining ring and/or that the driving element can be designed as a driving ring.

It may also be advantageous and simple to provide that the retaining element, in particular the retaining ring, has two or more support arms on which the points of engagement for the rotation device are formed.

In order to simply implement the centrifuge in terms of design, it may be provided that the points of engagement are arranged on the retaining element, in particular the retaining ring, and on the driving element, in particular the driving ring, each offset by 180° or by 120° or by 90°. Further variants of this type are conceivable.

In order to simplify handling, it may be provided that the rotation device has one or more actuators of variable length.

It may also be provided that one of the variable-length actuators is arranged between corresponding points of engagement of the retaining element, in particular the retaining ring, and the driving element, in particular the driving ring. The variable-length actuators can preferably operate according to a fluid operating principle (hydraulic or pneumatic) or according to an electric motor operating principle.

For example, it may be provided that the drum locking ring has an external thread and the lower drum part has a corresponding internal thread.

Handling can be further simplified if the retaining ring can be placed against the lower drum part and clamped to it. It may also be advantageously provided that the driving ring can be placed on the locking ring and fixed to it in a rotationally fixed manner.

From a design point of view, it may be advantageous to provide that at least two or more radially outwardly projecting support arms are formed on the retaining ring and on the driving ring and that the actuators are placed between corresponding support arms of the retaining ring and the driving ring.

For the implementation of the invention, it may further be advantageously provided that the actuators act on attachment points of the corresponding support arms, wherein the attachment points on the retaining ring and the attachment points on the support arms have the same radial distance from the axis of rotation (so that there is a pairwise symmetry) and preferably lie in one axial plane and/or that the actuators are designed identically.

It might be advantageous to have the support arms also lying in one plane. They can be of same length radially.

The invention also relates to a drum tool of a centrifuge.

The drum tool thus serves in an advantageous way to facilitate and thus simplify the opening and closing process of the drum, especially with regard to work safety. With the drum tool, the drum can advantageously be opened by exploiting a fluidic operating principle, in that the drum locking ring can be turned in the opening direction within the range of 0.5° to 45° (angular degree), particularly preferably 2° to 20°. Further unscrewing of the drum locking ring can then be done by hand.

BRIEF DESCRIPTION OF THE DRAWING FIGURES

Figure 2:
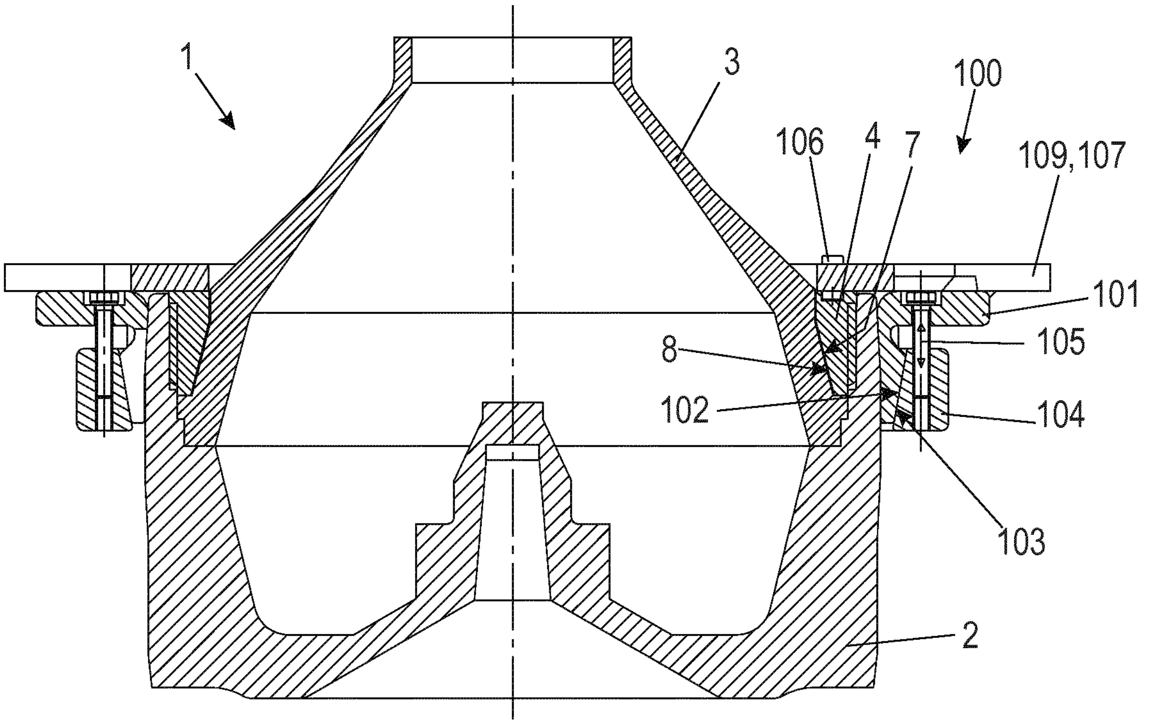
Figure 3:
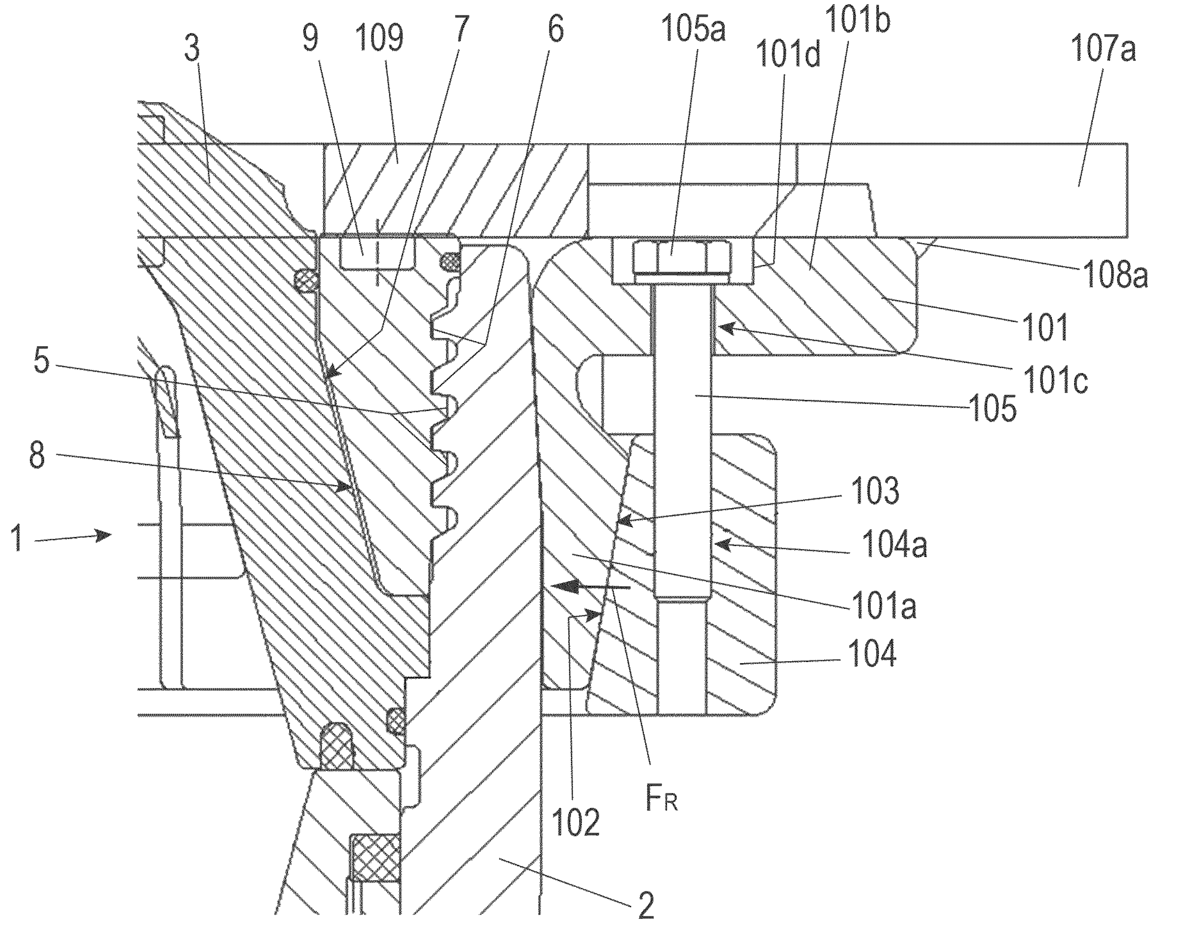
Figure 4:
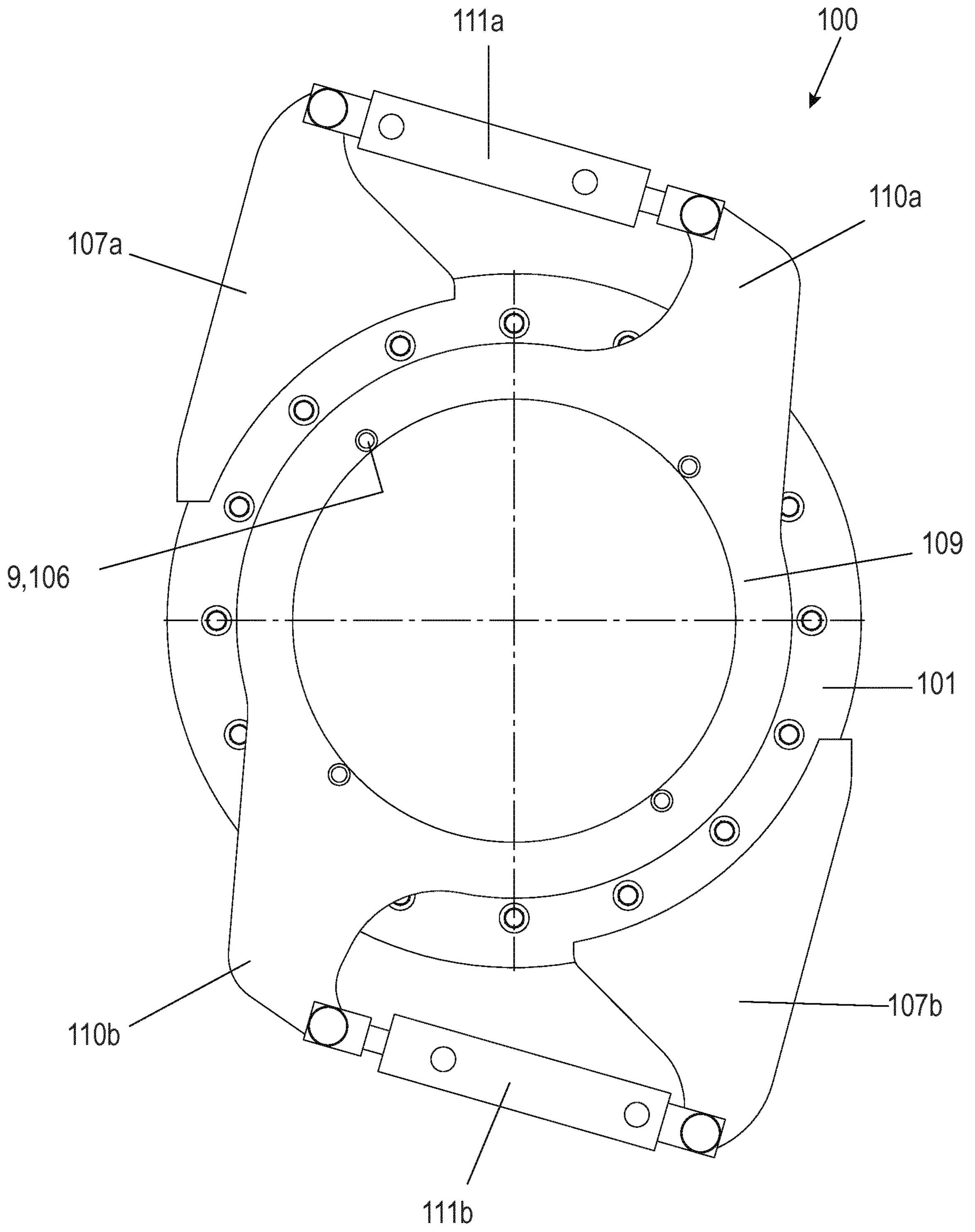

In the following, the invention is described in more detail by means of exemplary embodiments with reference to the figures, wherein:

FIG. 1: shows a front view of the centrifuge drum in a section, without the opening and/or closing device according to the invention;

FIG. 2: shows the front view of the centrifuge drum in a section from FIG. 1 with the opening and/or closing device according to the invention;

FIG. 3: shows a detail enlargement of FIG. 2, in which the drum tool according to the invention is shown;

FIG. 4: shows a top view of the centrifuge drum with the drum tool of the invention shown in FIG. 2

DETAILED DESCRIPTION

FIG. 1 shows a drum 1 of a centrifuge—here an example of a separator with vertical axis of rotation.

Drum 1 has several drum parts. These include a lower drum part 2 and an upper drum part 3 as well as a drum locking ring 4. A screw connection is formed between at least two of these parts. This must be tightened and loosened with a tool in order to open or close the drum.

Here the upper drum part 3 is inserted into the lower drum part 2. There it rests on an inner radial collar 2*a* of the lower drum part 2.

A gap is formed between the outer circumference of the conically formed upper drum part 3 and the inner circumference of the lower drum part 2, which in any case is cylindrical in sections. The locking ring 4, which is also cylindrical radially on the outside, is inserted into this gap. The locking ring 4 has an external thread and the lower drum part 2 a corresponding internal thread (see also FIG. 3). The locking ring 4 is screwed into the lower drum part 2. It rests on the radially outer edge of the upper drum part 3 and holds it in the lower drum part 2.

This is an exemplary type of screw connection. It is essential that a screw connection is formed between two drum parts. If no locking ring is provided, a screw connection can also be formed directly between the upper and lower parts of the drum. (not shown here). Further such and similar screw connection variants, which are not shown here, are also possible.

In FIGS. 1 and 3, the drum locking ring 4 has a conical inner surface 7 that geometrically corresponds to a conical outer surface 8 of the upper drum part 2. By screwing the drum locking ring 4 via its external thread 5 into the internal thread 6 of the lower drum part 2, the conical inner surface 7 of the drum locking ring 4 abuts the conical outer surface 8 of the upper drum part 3 so that it is firmly held in the lower drum part 2.

The drum locking ring 4 also has—here on its axial upper side—circumferentially distributed torque transmission geometries. These are formed here as cup-shaped recesses 9.

In FIG. 2, drum 1 is shown with a drum tool 100 according to the invention.

The drum tool 100 has at least one or more rotation devices as well as a retaining means and a driving means.

The retaining means and the driving means are here designed as a retaining ring 101 and a driving ring 109, which have attachment points or means of attachment for one or more actuators of variable length.

The retaining ring 101 here has an essentially angular cross-section with ring sections 101*a* and 101*b* sealed at right angles to each other.

The retaining ring 101 with its ring section 101*a* can be placed radially against the drum from outside. In this condition, the ring section 101*a* is vertically aligned. The other ring section 101*b* extends in this state radially outwards from ring section 101*a*.

The retaining ring 101 is in contact with the outer circumference of the lower drum part 2 with the ring section 101*a* in FIG. 3. It ends here in vertical direction approximately with the upper end of the lower drum part 2. In this way a bearing surface is formed in alignment with an upper axial plane of the drum locking ring 4.

The retaining ring 101 has several holes 101*c* vertically penetrating the radially aligned ring section 101*b*. The retaining ring 101 also has a conical outer surface 102 on its vertically extending ring section 101*a*. Corresponding to the conical outer surface 102 is a conical inner surface 103 of a clamping ring 104, which can be placed radially from below on the retaining ring 101 and is attached to it in FIG. 3 in this way.

The clamping ring 104 has several threaded holes 104*a* distributed around its circumference, here vertically aligned. These are aligned flush with the holes 101*c*. Here, screws 105 are screwed vertically from above through the holes 101*c* into the threaded holes 104*a*. The screw 105 has one screw head 105*a* each, which engages in a stepping or countersink 101*d* of the hole 101*c*, which is formed by the retaining ring 101.

By tightening the screws 105, the clamping ring 104 is pulled in axial direction with its conical inner surface 103 against the conical outer surface 102 of the retaining ring 101. As a result, the retaining ring 101 experiences a radial force FR on its circumferential surface directed towards an interior of drum 1, which leads to a frictional connection of the retaining ring 101 with the lower part of drum 2.

FIGS. 3 and 4 further show that at least two radially outwardly extending support arms 107*a*, 107*b* can be formed on the retaining ring 101, offset circumferentially. These rest on the retaining ring 101 and are attached to it.

For example, the support arms 107*a, b* can each be attached as a material connection in the form of a weld 108*a*, 108*b* or by other means, e.g., by means of pins and/or screws.

A driving element is disposed radially inside relative to supporting arms 107*a*, bat the same level as supporting arms 107*a, b*. This can be designed as driving ring 109. It can have the same axial extension as the support arms 107*a, b*.

In FIG. 4 the drum tool 100 is shown in a top view. The driving element 109 has at least two—here two—radially outwardly extending support arms 110*a*, 110*b*.

The driving element 109 has several—here four—driving bolts 106, which vertically—here vertically from above—engage in each of the recesses 9, which are formed here by the drum locking ring 4. Together with the respective recess 9, the driving bolts 106 form a torque transmission device.

One end of an actuator 111*a*, 111*b* is arranged at each of the supporting arms 110*a*, 110*b*. The respective actuator can be attached in an advantageously pivotable manner to the respective support arm 110*a*, 110*b*. The respective actuator 111*a*, 111*b* works here advantageously and simply according to a fluidic operating principle and can each be designed as a hydraulic cylinder, for example. Both actuators 111*a*, 111*b* can have the same preferred design, i.e., the same diameter and/or stroke and/or pressure/tension. The other ends of the respective actuators 111*a*, 111*b* are each supported by a corresponding support arm 107*a*, 107*b* of the retaining ring 101. The drum tool 100 thus has at least two actuators 111*a*, 111*b*, the length of which is variable.

The at least two actuators 111*a*, 111*b* or the two hydraulic cylinders thus generate a relative rotation between the support arms 107*a*, 107*b* and the corresponding support arms 110*a*, 110*b* by changing their length.

This results in a rotating movement of the drum locking ring 4 relative to the lower drum part 2, whereby the screw connection between the drum locking ring 4 or the upper drum part 3 and the lower drum part 2 can be loosened and preferably tightened again.

The two actuators 111*a*, 111*b* or the two hydraulic cylinders are advantageously mounted on the circumference of drum 1 or drum locking ring 4 offset by 180 degrees so that no unilateral torque acts on drum locking ring 4 and jamming of the screw connection between drum locking ring 4 or upper drum part 3 and lower drum part 2 is impossible. It is also possible to have more support arms and more actuators, e.g. three each, which would then be offset by 120°. Other finer, more even angular distributions can be implemented accordingly.

The actuators can each act symmetrically and in the same axial plane on the support arms 107*a*, 107*b*; 110*a*, 110*b* (at their attachment points).

Simultaneous actuation of the hydraulic cylinders results in an advantageously even rotational movement of the drum locking ring 4 or the upper drum part 3 relative to the lower drum part 2.

No resulting torque acting on the lower drum part 2 can be applied in this way, provided that—as explained above—the actuators 111*a*, 111*b* are designed in the same way. The lower drum part 2 therefore does not have to be fixed against a possible rotary movement during the opening process.

If the actuators 111*a*, 111*b* or the fluid cylinders are designed as double-acting cylinders, so that the piston rods are extended and retracted pneumatically or hydraulically, the drum tool 100 can also be used in the described manner to close the screw connection of the lower drum part 2 or the upper drum part 3 and the drum locking ring 4.

The drum tool 100 is advantageously used to facilitate the opening and closing process of drum 2, especially with regard to work safety. Drum tool 100 allows drum 1 to be opened using a fluidic operating principle by rotating the drum locking ring in the range of 0.5° to 45° (angular degree), particularly preferably 2° to 20° in the opening direction. Further unscrewing of the drum locking ring can then be done by hand.

By turning the drum locking ring 4 in the opening direction, it is slightly lifted due to the pitch of the thread 5, 6. This height offset between drum locking ring 4 and retaining ring 101 is compensated by the play within the pivotable attachments of the actuators.

The impulse-controlled opening process, which causes wear and tear, using a striking wrench designed as a ring spanner is completely eliminated.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERALS

1 Drum
2 Lower drum part
2*a* Collar
3 Upper drum part
4 Drum locking ring
5 External thread
6 Internal thread
7 Inner surface
8 External surface
9 Recess
100 Drum tool
101 Retaining ring
101*a* Ring section
101*b* Ring section
101*c* Hole
101*d* Stepping
102 Outer surface
103 Inner surface
104 Clamping ring
104*a* Threaded hole
105 Screw
105*a* Screw head
106 Driving bolt
107*a*, 107*b* Support arms
108*a*, 108*b* Weld
109 Driving ring
110*a*, 110*b* Support arm
111*a*, 111*b* Actuator
FR Radial force

The invention claimed is:

1. A system comprising:

a centrifuge configured to centrifugal process a flowable product, wherein the centrifuge comprises a rotatable drum defining a centrifuge chamber, wherein the rotatable drum has at least two drum parts rotatable relative to one another on a thread; and a drum tool configured to open and/or close the rotatable drum by rotating the at least two drum parts that are screwed together via the thread, wherein the drum tool comprises a retaining element configured to attach to a first one of the at least two drum parts;

a driving element configured to attach to a second one of the at least two drum parts; and at least one rotation device configured to rotate the retaining element relative to the driving element together with the at least two drum parts, wherein the retaining element and the driving element each have two or more points of engagement with the at least one rotation device, wherein two or more points of engagement are arranged symmetrically in such a way that forces generated by the at least one rotation device produce a torque for relative rotation of the at least two drum parts, but no resulting force is produced that acts unilaterally on the at least two drum parts that are screwed together via the thread, and wherein the at least one rotation device comprises one or more actuators of variable length.

2. The system of claim 1, wherein the retaining element is a retaining ring the driving element is a driving ring.

3. The system of claim 2, wherein the retaining ring has two or more support arms on which the two or more points of engagement for the at least one rotation device are formed.

4. The system of claim 2, wherein the two or more points of engagement are arranged on the retaining ring and the driving ring, each offset by 180°, 120° or 90°.

5. The system of claim 1, wherein one of the one or more actuators of variable length is arranged between corresponding ones of the two or more points of engagement of the retaining element and on the driving element.

6. The system of claim 1, wherein the one or more actuators operate according to a fluidic or an electromotive operating principle.

7. The system of claim 2, wherein the retaining ring is placed against a lower drum part of the at least two drum parts and is tightly clamped to the lower drum part.

8. The system of claim 2, wherein the driving ring is placed on a locking ring and is fixed to the locking ring in a rotationally fixed manner.

9. The system of claim 2, wherein at least two or more radially outwardly projecting support arms are respectively attached to the retaining ring and the driving ring.

10. The system of claim 9, wherein the one or more actuators are arranged between corresponding support arms of the retaining ring and the driving ring.

11. The system of claim 9, wherein the one or actuators engage on attachment points of the corresponding support arms, wherein the support arms are each symmetrical to an axis of rotation of the rotatable drum and lie in an axial plane.

12. The system of claim 5, wherein the one or more actuators include at least two actuators that have a same design.

13. The system of claim 1, wherein the at least two drum parts include a lower drum part and an upper drum part, and wherein the lower drum part and the upper drum part are either directly screwed together, or a drum locking ring and/or the upper drum part or the lower drum part are screwed together.

14. The system of claim 13, wherein the drum locking ring has an external thread and the lower drum part has a corresponding internal thread.

15. A drum tool comprising:

a retaining element configured to attach to a first one of at least two drum parts of a rotatable drum of a centrifuge;

a driving element configured to attach to a second one of the at least two drum parts of the rotatable drum of the centrifuge, wherein the first one of the at least two drum parts is relative to the second one of the at least two drum parts via a thread; and at least one rotation device configured to rotate the retaining element relative to the driving element together with the at least two drum parts, wherein the retaining element and the driving element each have two or more points of engagement with the at least one rotation device, wherein two or more points of engagement are arranged symmetrically in such a way that forces generated by the at least one rotation device produce a torque for relative rotation of the at least two drum parts, but no resulting force is produced that acts unilaterally on the at least two drum parts that are screwed together via the thread;

wherein the drum tool is configured to open and/or close the rotatable drum by rotating the at least two drum parts that are screwed together via the thread, and wherein the at least one rotation device comprises one or more actuators of variable length.

* * * * *